United States Patent [19]
Okada et al.

[11] Patent Number: 6,083,291
[45] Date of Patent: Jul. 4, 2000

[54] GAS TRANSFER PIPE ARRANGEMENT

[75] Inventors: Tsuyoshi Okada, Yokosuka; Yasuo Suzuki, Chigasaki; Syoichi Yamada, Yokosuka; Kenji Tamura, Yokohama, all of Japan

[73] Assignee: JGC Corporation, Tokyo, Japan

[21] Appl. No.: 08/923,115

[22] Filed: Sep. 4, 1997

[30] Foreign Application Priority Data

Sep. 5, 1996 [JP] Japan ................................. 8-255442
Jul. 18, 1997 [JP] Japan ................................. 9-209816

[51] Int. Cl.$^7$ ................................................. B01D 45/12
[52] U.S. Cl. ........................... 55/337; 55/396; 55/423; 55/424; 55/455; 55/456; 55/457
[58] Field of Search ..................... 55/392, 394, 395, 55/396, 397, 398, 423, 424, 452, 454, 455, 456, 457, 337, 336, 331, 330, 327

[56] References Cited

U.S. PATENT DOCUMENTS

| | | | |
|---|---|---|---|
| 1,735,298 | 11/1929 | Pfeffer | 55/396 |
| 2,186,344 | 1/1940 | Price | 55/396 |
| 2,659,451 | 11/1953 | Baird | 55/397 |
| 2,921,646 | 1/1960 | Poole | 55/327 |
| 2,925,884 | 2/1960 | Campbell | 55/392 |
| 3,258,895 | 7/1966 | Wiebe et al. | 55/327 |
| 3,360,908 | 1/1968 | Baily | 55/398 |
| 3,461,652 | 8/1969 | Sato | 55/452 |
| 3,546,854 | 12/1970 | Muller | 55/457 |
| 3,633,342 | 1/1972 | Richardson | 55/457 |
| 3,641,745 | 2/1972 | Moore | 55/457 |
| 3,713,279 | 1/1973 | Moore | 55/457 |
| 3,885,934 | 5/1975 | Eads et al. | 55/457 |
| 3,895,930 | 7/1975 | Campolong | 55/423 |
| 4,180,391 | 12/1979 | Perry, Jr. et al. | 55/396 |
| 4,311,494 | 1/1982 | Conner et al. | 55/457 |
| 5,510,017 | 4/1996 | Abdullayev | 55/456 |

OTHER PUBLICATIONS

Perry, John H., "Phase Separation", *Chemical Engineer's Handbook*, Fourth Edition, 1963, pp. 18–83–18–91.
Ludwig, Ernest E., "Mechanical Separations", *Applied Process Design for Chemical and Petrochemical Plants*, vol. I, 2nd Edition, 1997, pp. 144–180.

*Primary Examiner*—Duane S. Smith
*Attorney, Agent, or Firm*—McDermott, Will & Emery

[57] ABSTRACT

A gas transfer pipe arrangement includes a pipe in which gas containing droplets flows. A centrifugal force type separation unit is provided in the pipe for applying a radial centrifugal force to the gas flowing in the pipe so that the droplets in the gas adhere to an inner periphery of the pipe to be separated from the gas. A liquid collecting unit is annularly provided on the inner periphery of the pipe at a position downstream of the centrifugal force type separation unit for collecting a liquid from the droplets separated by the centrifugal force type separation unit. A discharge unit is provided at a lower side of the pipe for discharging the liquid collected by the liquid collecting unit to the exterior of the pipe.

10 Claims, 11 Drawing Sheets

GAS TRANSFER PIPE ARRANGEMENT

BACKGROUND OF THE INVENTION

1. Field of the Invention

The present invention relates to a gas transfer pipe arrangement for transferring gas containing droplets of diameters no less than 8 μm at a velocity no less than 6 m/sec, which is employed, for example, in the chemical plant.

2. Description of the Prior Art

In many plants in petroleum refining industries, petrochemical industries and the like, droplets may be generated in the gas flow during processing. Upon transferring the gas flow containing the droplets, it may be necessary, depending on process steps carried out at a destination of the transferred gas, to remove the droplets from the gas flow. For example, at an inlet port of a compressor in the LNG or ethylene plant, it is required to remove no less than 99.9% of droplets having diameters of no less than 8 μm in view of the properties of gas. On the other hand, in a certain reaction system, it is necessary to suppress the amount of droplets contained in the gas flow as much as possible. For achieving this, a special installation, called a knockout drum, a compressor suction drum or the like, having a droplet separating function is provided between adjacent pipes so as to remove the droplets in the gas flow during transfer of the gas.

There have been available various types of droplet separators for such a use, for example, a gravity type in which droplets are separated through gravitational precipitation, a impingement type in which droplets are separated through impingement against a pad which, on the other hand, passes gas therethrough, an inertial force type in which droplets are separated through a difference in specific gravity between gas and droplets utilizing inertial forces, and a centrifugal force type in which droplets are separated through a difference in specific gravity between gas and droplets by applying a centrifugal force to droplets in the gas flow.

FIG. 12 shows an example of the centrifugal force type. In this example, swirl-flow forming means called a tuyere 82 is provided in a separator vessel 81. The tuyere 82 comprises triangular vanes which are arranged at regular intervals so as to form an umbrella shape on the whole. The tuyere 82 is disposed so that an apex thereof is oriented in an axial direction of the separator vessel 81 toward an upstream side relative to the gas flow. Gas containing droplets is supplied into the separator vessel 81 via a gas inlet port 81a connected to an upstream pipe, and then given swirl flows upon passing the tuyere 82. The droplets are separated from the gas due to centrifugal forces caused by the swirl flows. In the figure, 81b denotes a gas outlet port connected to a downstream pipe, and 81c denotes a liquid outlet port.

FIG. 13 shows an example of the inertial force type. In this example, impingement plates called vanes 84 each having, for example, a corrugated shape are arranged at regular intervals in a separator vessel 83. Each of the vanes 84 is disposed vertically and in parallel to a flow passage of gas. In this droplet separator, the gas containing droplets flows zigzag between the adjacent vanes 84. While flowing, inertial forces are applied to droplets having large specific gravities and large diameters so that the droplets deviate from the flow line of the gas and collide against the surfaces of the vanes 84 to form liquid films so as to be separated from the gas flow. In the figure, 84a denotes a gas inlet port, 84b a gas outlet port, and 84c a liquid outlet port. Flow-passage members 85a and 85b are provided between the gas inlet port 84a and the separator vessel 83 and between the separator vessel 83 and the gas outlet port 84b, respectively, to form the flow passage of the gas.

FIG. 14 shows an example of the impingement type. In this example, a mesh pad 87 is provided in a separator vessel 86 at an upper side thereof. In this droplet separator, gas containing droplets is introduced into the separator vessel 86 via a gas inlet port 86a provided substantially at the center of the side wall of the separator vessel 86 and flows upward toward a gas outlet port 86b provided at the top of the separator vessel 86 via the pad 87. Upon passing the pad 87, the droplets collide against the surfaces of the pad 87 to gradually form liquid films which then drop due to the gravity, so that the droplets are separated from the gas flow. In the figure, 86c denotes a liquid outlet port.

In the foregoing droplet separator of any type, however, the applicable range of the gas velocity is small and the inner diameter of the separator vessel is required to be set greater than that of the pipe. Thus, the conventional droplet separator is in the form of a specially prepared large-diameter casing arranged between the adjacent pipes. Accordingly, due to differences in shape and size between the pipe and the casing, the inner diameters are rapidly increased or reduced at a coupling portion therebetween. This increases a pressure drop. Further, as described above, since the shapes of the pipe and the droplet separator differ from each other, the gas flow tends to be disturbed and the droplet locus tends to be disordered so that the allowable range of disturbance of the gas flow and the droplet locus is small. Hence, the designing which can ensure further safety is required, thereby to cause one factor of cost increase.

Further, in the LNG plant, since the inner diameter of the pipe is large, that is, some tens of centimeters to about 1 m, the droplet separator is increased in size to match the large-diameter pipe. Therefore, the cost of the droplet separator itself is increased, and a corresponding large space therefore is required, and further the piping becomes complicate, resulting in cost increase on the whole. Further, since the size increase of the droplet separator causes the size increase of a device for collecting the droplets separated by the droplet separator, a lot of labor and time are required for maintenance, check and recovery.

SUMMARY OF THE INVENTION

Therefore, it is an object of the present invention to provide a gas transfer pipe arrangement, wherein gas-liquid separation is performed in a gas transfer pipe so as to achieve reduction in cost of the whole plant.

It is another object of the present invention to provide a gas transfer pipe arrangement, wherein a pressure drop is small and, even if the gas velocity is increased, removal of droplets can be reliably achieved.

The present invention has been made aiming at using a gas transfer pipe for not only transferring gas containing droplets, but also working as a droplet separator.

According to one aspect of the present invention, a gas transfer pipe arrangement comprises a pipe in which gas containing droplets of diameters no less than 8 μm flows at a velocity no less than 6 m/sec; a centrifugal force type separation unit provided in the pipe for applying a radial centrifugal force to the gas flowing in the pipe so that the droplets in the gas adhere to an inner periphery of the pipe to be separated from the gas; a liquid collecting unit annularly provided at the inner periphery of the pipe at a position downstream of the centrifugal force type separation unit for collecting a liquid from the droplets separated by the centrifugal force type separation unit; and a discharge unit for discharging the liquid collected by the liquid collecting unit to the exterior of the pipe.

It may be arranged that the centrifugal force type separation unit comprises a plurality of triangular guide plates which are arranged around an axis of the pipe with given gaps between the adjacent guide plates in a circumferential direction so as to form an essentially conical structure with its apex oriented in an axial direction of the pipe toward an upstream side relative to the flow of the gas, each of the guide plates arranged slantly relative to a diameter of the pipe.

It may be arranged that the centrifugal force type separation unit comprises a cylindrical body having an axis which coincides with an axis of the pipe and provided at its upstream end with an essentially conical apex portion oriented in an axial direction of the pipe toward an upstream relative to the flow of the gas; and a helical vane mounted on an outer periphery of the cylindrical body so as to extend helically along an axis of the cylindrical body, the helical vane having an outer edge which is in abutment with the inner periphery of the pipe.

It may be arranged that the centrifugal force type separation unit comprises a helical body having an axis which coincides with an axis of the pipe and extending helically along the axis of the pipe, the helical body having an outer edge which is in abutment with the inner periphery of the pipe.

It may be arranged that calming means of gas flow is provided upstream of the centrifugal force type separation unit.

It may be arranged that calming means comprises one of a mesh pad and a perforated plate.

It may be arranged that the pipe has a bent portion, and that the centrifugal force type separation unit is provided at a position spacing downstream from the bent portion a linear distance which is no less than 2.5 times a diameter of the pipe.

It may be arranged that the pipe has a bent portion, and that the centrifugal force type separation unit is provided at a position spacing downstream from the bent portion a linear distance which is no less than 1.5 times a diameter of the pipe.

It may be arranged that the droplets are composed of, as a main component, hydrocarbon with carbon number 4 to 8, and the gas is composed of, as a main component, hydrocarbon with carbon number 1 to 8.

According to another aspect of the present invention, a gas transfer pipe arrangement comprises a pipe in which gas containing droplets of diameters no less than 8 $\mu$m flows at a velocity no less than 6 m/sec; a plurality of flow passage members provided in the pipe for dividing a flow passage in the pipe into a corresponding number of small-diameter flow passages so as to form a bundle of the small-diameter flow passages; a plurality of centrifugal force type separation units each provided in corresponding one of the flow passage members for applying a radial centrifugal force to the gas flowing in the flow passage member so that the droplets in the gas adhere to an inner periphery of each of the flow passage members to be separated from the gas; a plurality of liquid collecting units each annularly provided at the inner periphery of corresponding one of the flow passage members at a position downstream of the centrifugal force type separation unit for collecting a liquid from the droplets separated by the centrifugal force type separation unit; and a discharge unit for discharging the liquid collected by the liquid collecting units to the exterior of the pipe.

It may be arranged that each of the centrifugal force type separation units comprises a plurality of triangular guide plates which are arranged around an axis of the corresponding flow passage member with given gaps between the adjacent guide plates in a circumferential direction so as to form an essentially conical structure with its apex oriented in an axial direction of the corresponding flow passage member toward an upstream side relative to the flow of the gas, each of the guide plates arranged slantly relative to a diameter of the corresponding flow passage member.

It may be arranged that each of the centrifugal force type separation units comprises a cylindrical body having an axis which coincides with an axis of the corresponding flow passage member and provided at its upstream end with an essentially conical apex portion oriented in an axial direction of the corresponding flow passage member toward an upstream side relative to the flow of the gas; and a helical vane mounted on an outer periphery of the cylindrical body so as to extend helically along an axis of the cylindrical body, the helical vane having an outer edge which is in abutment with the inner periphery of the corresponding flow passage member.

It may be arranged that each of the centrifugal force type separation units comprises a helical body having an axis which coincides with an axis of the corresponding flow passage member and extending helically along the axis of the corresponding flow passage member, the helical body having an outer edge which is in abutment with the inner periphery of the corresponding flow passage member.

It may be arranged that calming means is provided upstream of the centrifugal force type separation units.

It may be arranged that the calming means comprises one of a mesh pad and a perforated plate.

It may be arranged that the pipe has a bent portion, and that each of the centrifugal force type separation units is provided at a position spacing downstream from the bent portion a linear distance which is no less than 2.5 times a diameter of the pipe.

It may be arranged that the pipe has a bent portion, and that each of the centrifugal force type separation units is provided at a position spacing downstream from the bent portion a linear distance which is no less than 1.5 times a diameter of the pipe.

It may be arranged that the droplets are composed of, as a main component, hydrocarbon with carbon number 4 to 8, and the gas is composed of, as a main component, hydrocarbon with carbon number 1 to 8.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow.

The present invention pays attention to the fact that, in the conventional arrangement where the droplet separator is provided between the adjacent pipes, the pressure drop becomes significant when the gas velocity is large. Specifically, the velocity within the gas transfer pipe In the chemical plant is normally no less than 6 m/sec and, if the pressure drop is large in such high velocity, the energy consumption, that is, the operation cost, of a compressor and the like is increased. In view of this, the present invention deals with a case where the velocity is no less than 6 m/sec. Further, since the present invention is particularly effective for a case where the diameters of droplets are no less than 8 $\mu$m and such droplets are required to be removed in the chemical plant, the present invention deals with a case where the droplets having diameters no less than 8 $\mu$m are separated from the gas velocity no less than 6 m/sec.

Now, the first preferred embodiment of the present invention will be described with reference to FIGS. 1 to 5.

Figure 1:
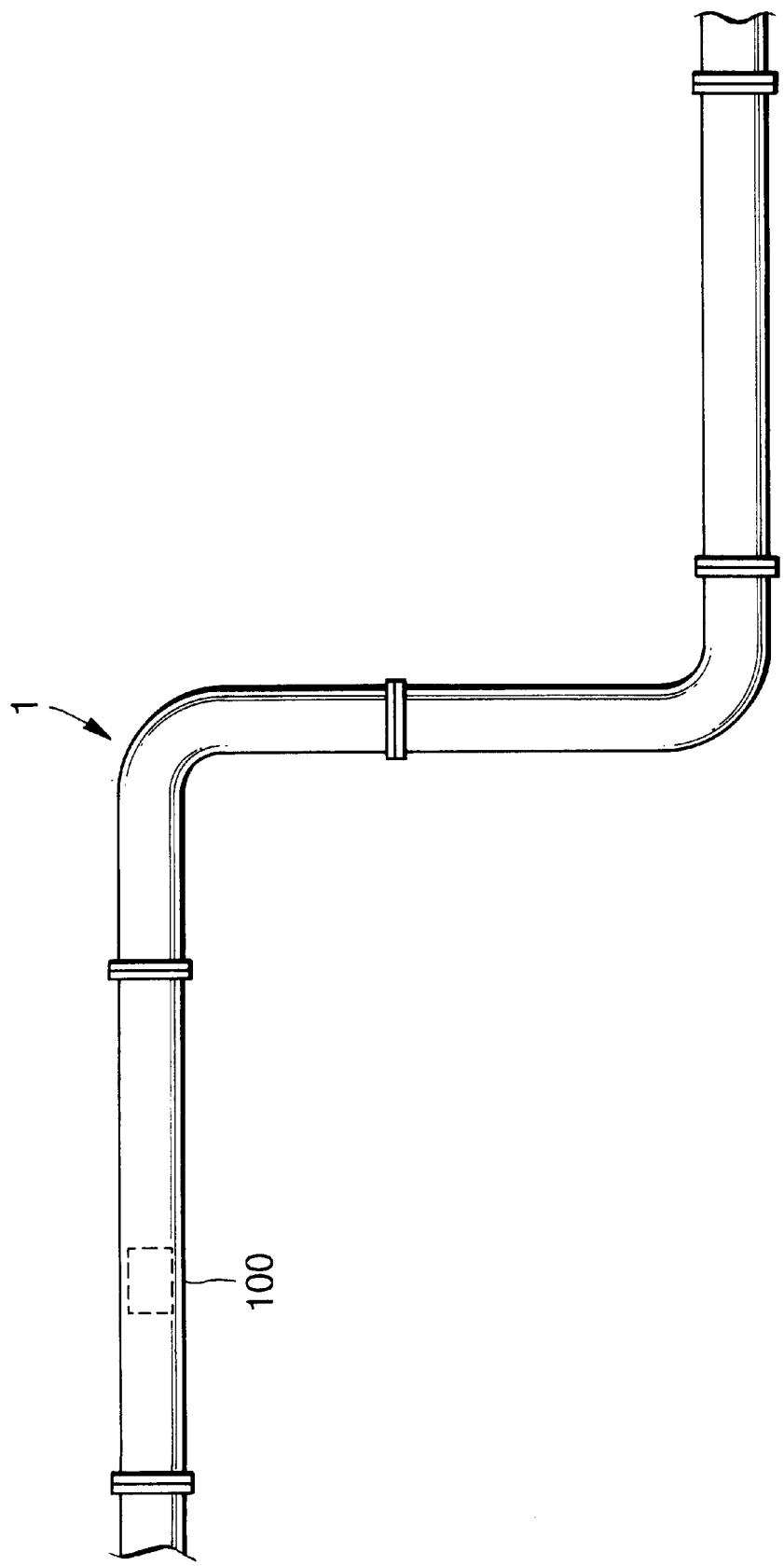
FIG. 1 is a diagram showing a gas transfer pipe unit including a pipe which is employed in a gas transfer pipe arrangement according to a first preferred embodiment of the present invention.

FIG. 1 shows a pipe unit 1 for transferring gas containing droplets of diameters no less than 8 $\mu$m to a compressor at the velocity no less than 6 m/sec in, for example, the petroleum refining plant. The pipe unit 1 is made of metal and comprises large-diameter pipes having inner diameters of, for example, 1 m and coupled to each other by welding. In the figure, numeral 100 denotes one of such pipes which is employed in a gas transfer pipe arrangement according to the first preferred embodiment of the present invention and welded to the adjacent pipes.

Figure 2:
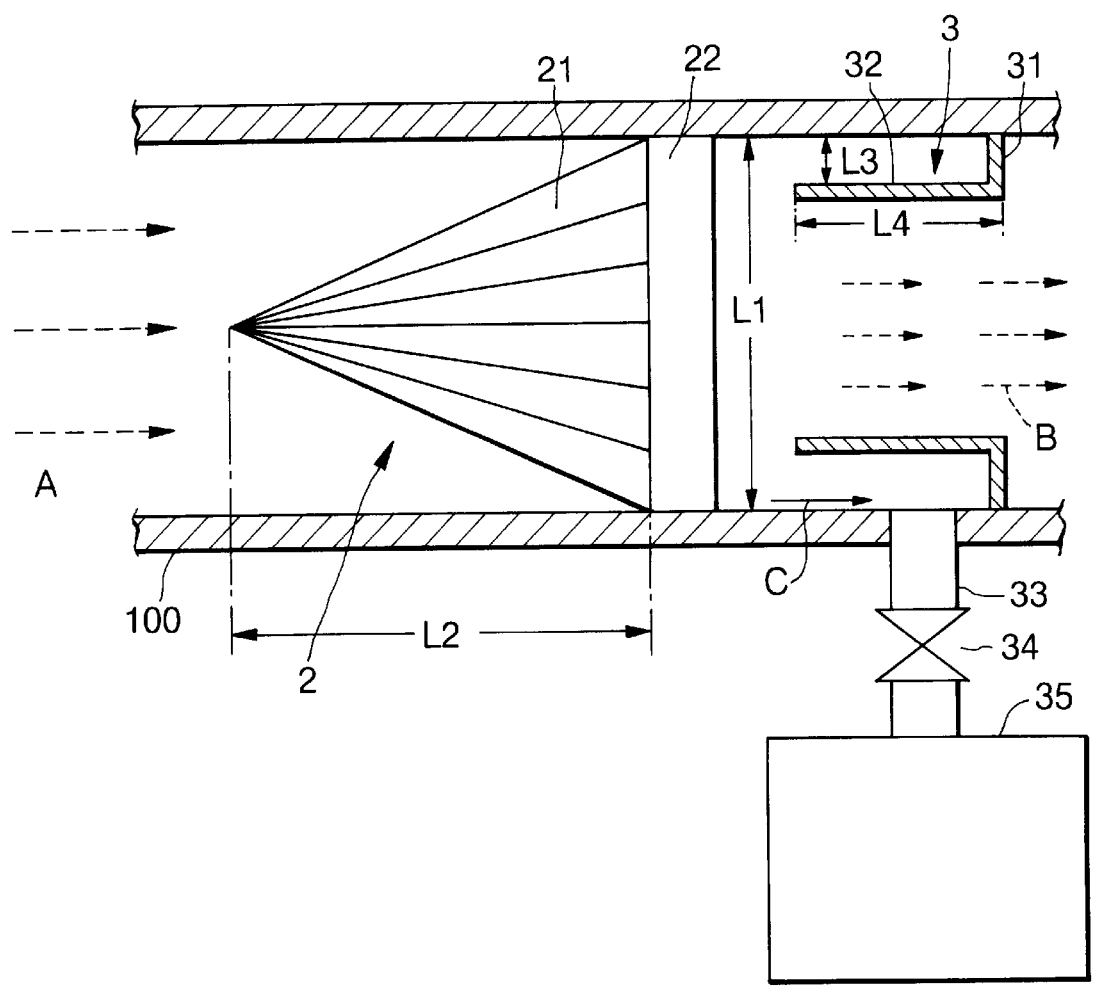
FIG. 2 is a sectional view showing the gas transfer pipe arrangement according to the first preferred embodiment of the present invention.

FIG. 2 is a sectional view of a portion of the pipe 100 identified by a dotted line in FIG. 1. In the figure, numeral 2 denotes a centrifugal force type separation unit. The separation unit 2 applies radial centrifugal forces to the gas flowing in the pipe 100 so that droplets in the gas adhere to the inner periphery of the pipe 100 and hence are separated from the gas.

Figure 3A:
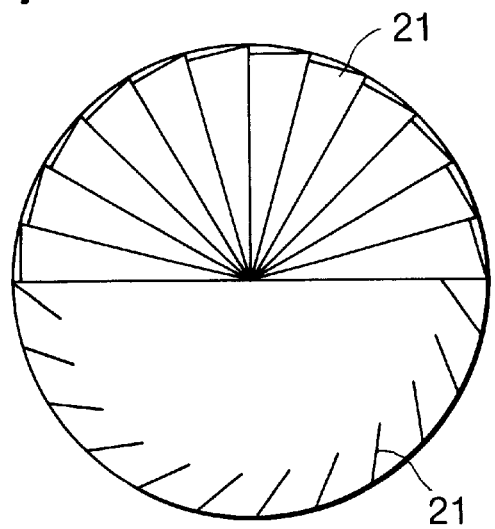
FIGS. 3A to 3C are diagrams for explaining a structure of a centrifugal force type separation unit employed in the gas transfer pipe arrangement according to the first preferred embodiment of the present invention.
Figure 3B:
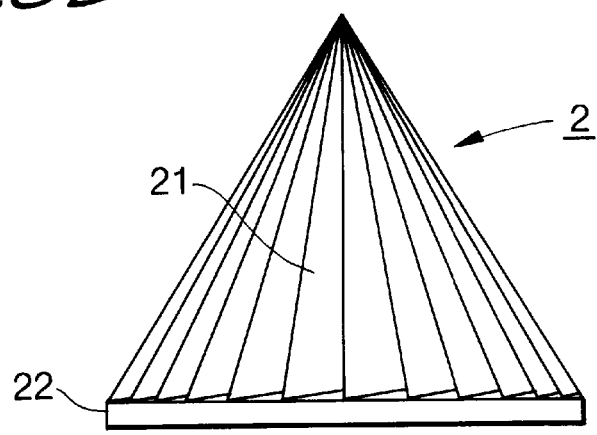
Figure 3C:
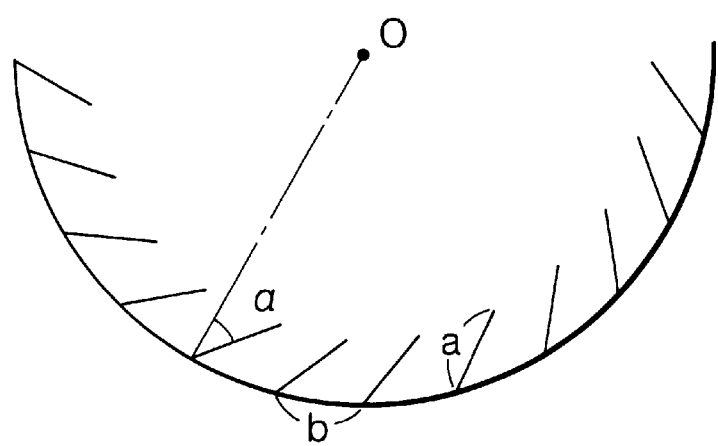

As shown in FIGS. 2 and 3A–3C, the separation unit 2 comprises a plurality of triangular guide plates 21 fixedly provided on a ring-shaped support frame 22. Each of the guide plates 21 is arranged slantly relative to a diameter of the pipe 100 (the upper part of FIG. 3A shows the guide plates 21 from the top while the lower part thereof shows the guide plates 21 from the bottom), spacing given gaps from the adjacent guide plates 21 in a circumferential direction. The guide plates 21 form an essentially conical umbrella-shaped structure (tuyere) with its apex oriented in an axial direction of the pipe 100 toward an upstream side relative to the gas flow. The outer periphery of the support frame 22 is welded to the inner periphery of the pipe 100. Accordingly, the gas flowing in the pipe 100 passes the gaps between the guide plates 21 so that the droplets are separated from the gas and then guided to the inner periphery of the pipe 100.

The design specification of the centrifugal force type separation unit 2 differs depending on diameters of the pipe 100. For example, if the diameter of the pipe 100 is 1 m, the separation unit 2 comprises about 50 guide plates 21 with a diameter L1 of the bottom being about 1 m, a height L2 being about 0.6 m, a length a of a base of the guide plate 21 being about 7 cm, a circumferential distance b between the outer ends of the bases of the adjacent guide plates 21 being about 6 cm, and an angle a between a line extending from the center O to the outer end of the base of the guide plate 21 and the base being about 45° (see FIG. 3C).

Figure 4:
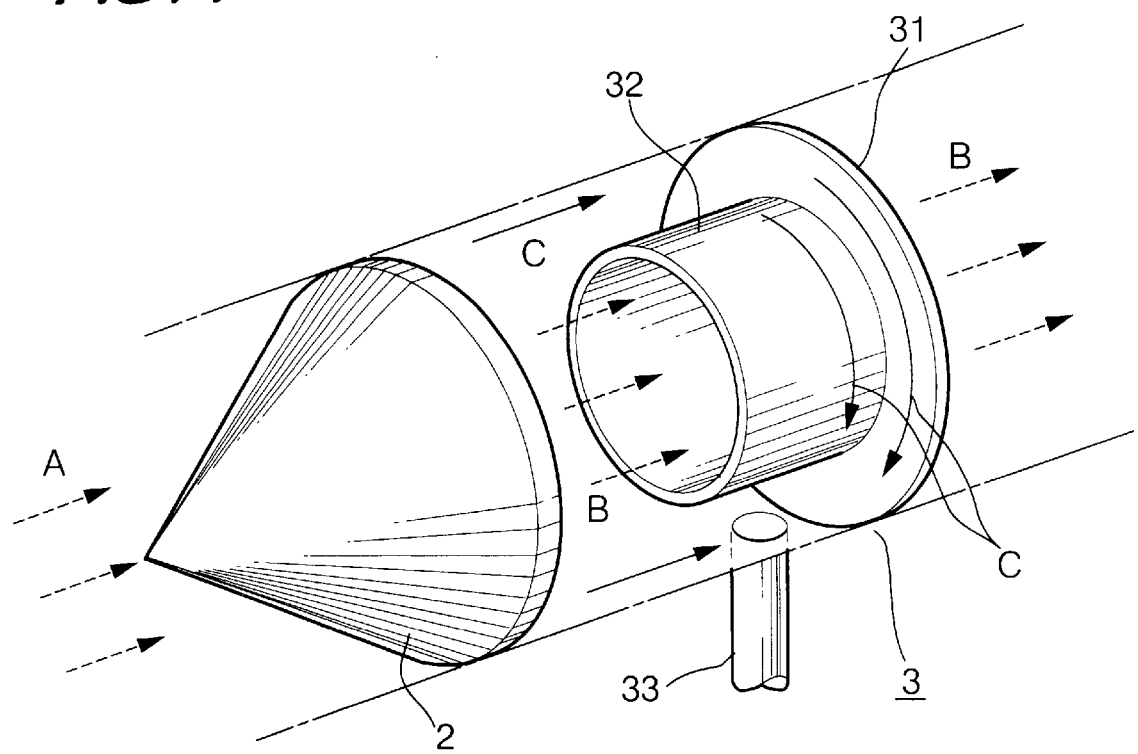
FIG. 4 is a perspective view showing the centrifugal force type separation unit and a liquid collecting unit employed in the gas transfer pipe arrangement according to the first preferred embodiment of the present invention.

As shown in FIGS. 2 and 4, downstream of the separation unit 2 is provided a liquid collecting unit 3 formed annular along the inner periphery of the pipe 100. The liquid collecting unit 3 comprises an annular fixed portion 31 welded to the inner periphery of the pipe 100, and a tubular portion 32 extending in the axial direction of the pipe 100 toward the upstream side. For example, a distance L3 between the tubular portion 32 and the inner periphery of the pipe 100 is set to 10 to 20 mm and a length L4 is set to about 200 mm.

Just upstream of the fixed portion 31 of the liquid collecting unit 3, a discharge pipe 33 is connected to the pipe 100 at a lower side thereof for discharging the liquid collected by the liquid collecting unit 3 to the exterior of the pipe 100. The other end of the discharge pipe 33 is connected to a trap 35 via a valve 34.

Figure 5:
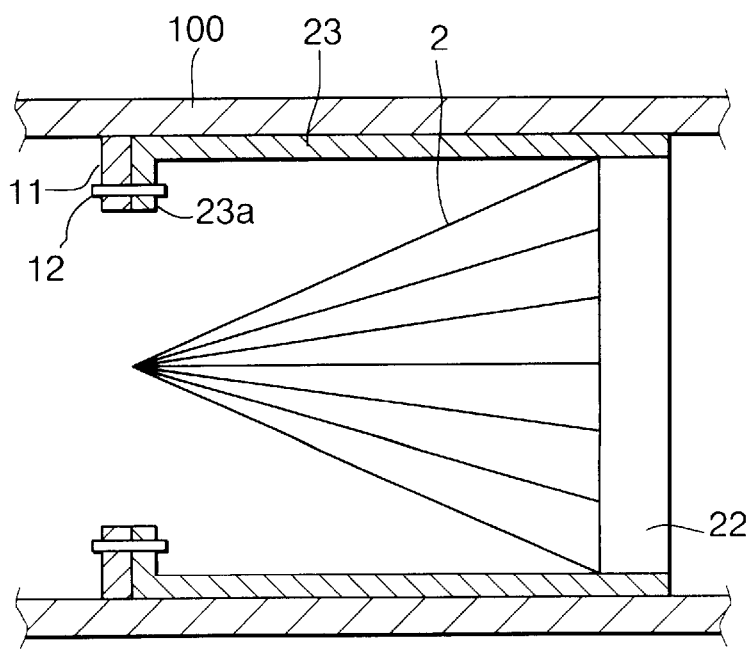
FIG. 5 is a diagram showing a modification of the first preferred embodiment of the present invention.

As shown in FIG. 5, it may be arranged that the separation unit 2 is fixed to the inner periphery of a tubular support member 23 fitted in the pipe 100, an upstream end of the support member 23 is bent radially inward to form a bent end 23a, the bent end 23a is secured to a ring-shaped fixed member 11, fixed to the inner periphery of the pipe 100, using fixing pins 12 at, for example, four positions in a circumferential direction, and thus the separation unit 2 is detachably provided in the pipe 100.

Figure 6:
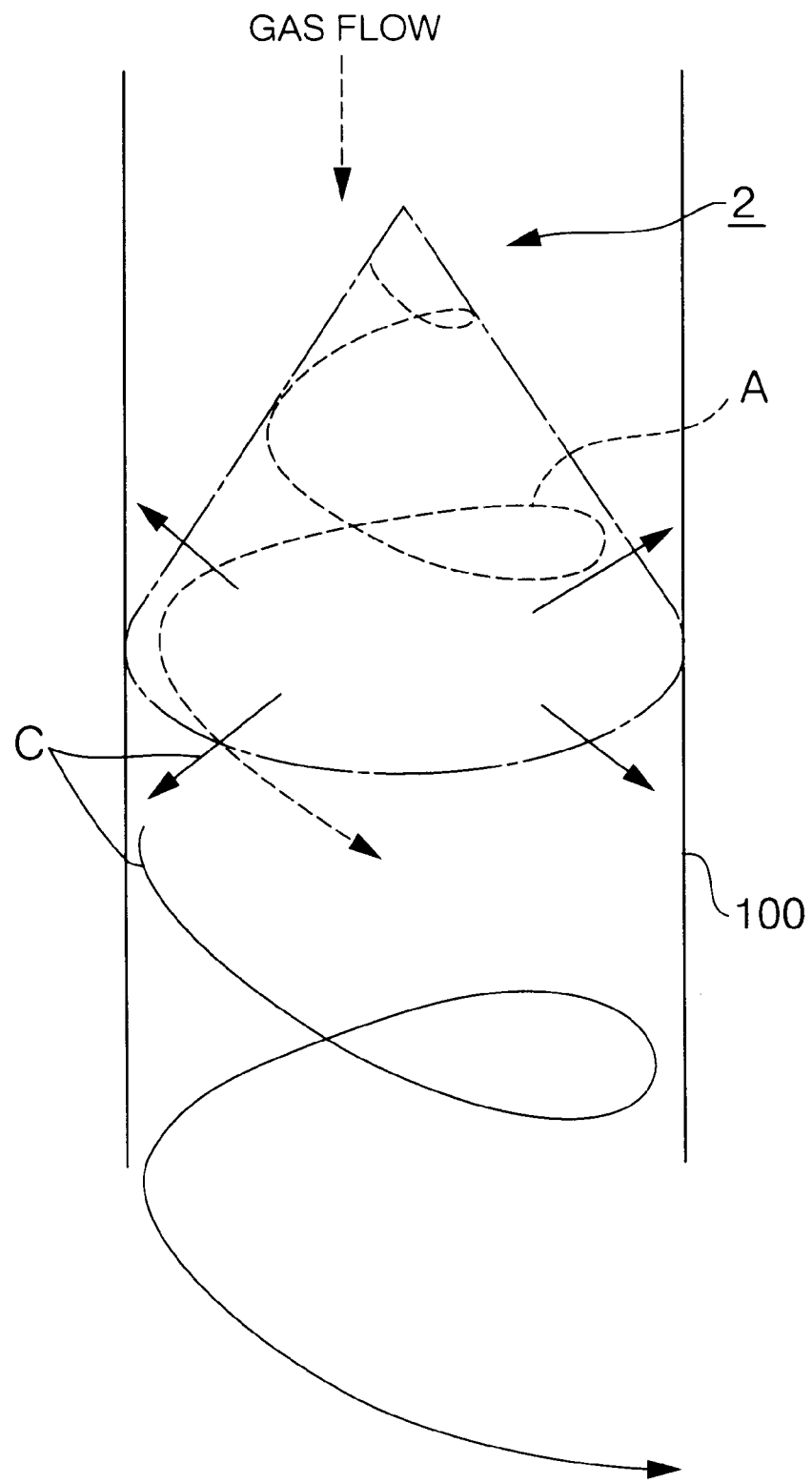
FIG. 6 is a diagram for explaining an operation of the centrifugal force type separation unit according to the first preferred embodiment of the present invention.

In the gas transfer pipe arrangement having the foregoing structure, the gas flow, identified by arrows A in FIG. 2, containing the droplets passes the gaps between the adjacent guide plates 21 of the separation unit 2. Since each guide plate 21 is arranged slantly relative to the diameter of the pipe 100, the gas flow containing the droplets is formed into swirl flows swirling around the axis of the pipe 100 as shown by an arrow A in FIG. 6 due to composition of a force to flow along the axis of the pipe 100 and a force to flow along the guide plate 21. The swirl flows generate the centrifugal forces.

At this time, due to the inertial forces, the droplets contained in the gas flow collide against the surfaces of the guide plates 21 and are collected to form liquid films. These liquid films are forced outward due to the centrifugal forces generated by the swirling gas flows and flow to the downstream side while swirling along the inner periphery of the pipe as shown by arrows C in FIG. 6. On the other hand, the gas flows at the center portions of the pipe 100 to the downstream side. In this fashion, the droplets and the gas flow in the pipe 100 while being separated.

As shown in FIG. 4, the liquid films C flow downstream along the inner periphery of the pipe 100, then collide against the fixed portion 31 of the liquid collecting unit 3 to flow downward, and then discharged to the exterior of the pipe 100 via the discharge pipe 33 so as to be collected into the trap 35. At this time, splash of the liquid films is prevented by the tubular portion 32 of the liquid collecting unit 3. On the other hand, as shown by arrows B, the gas passes the center opening of the liquid collecting unit 3 and further flows downstream. In this fashion, the droplets are removed from the gas flow.

As described above, in this embodiment, the centrifugal force type separation unit 2 and the liquid collecting unit 3 are provided in the gas transfer pipe 100 so that the gas flow is formed into the swirl flows and, utilizing the centrifugal forces produced by the swirl flows, the droplets are caused to flow along the inner periphery of the pipe 100 as liquid films and then collected by the annular liquid collecting unit 3. Therefore, the droplets can be removed from the gas flow within the gas transfer pipe 100.

Since the separation between the gas and the droplets is carried out within the gas transfer pipe, it is not necessary to arrange the specially prepared large-diameter droplet separator between the pipes. Accordingly, as compared with the prior art, the change in inner diameter of the gas flow passage is extremely smaller so that the disturbance of the gas flow and the increase of the pressure drop, which would be otherwise caused by the change in inner diameter of the gas flow passage, can be suppressed. Hence, the applicable range of the gas velocity can be increased while the pressure drop can be reduced.

For example, as will be understood from the results of later-described experiments carried out by the present inventors, the applicable range of the gas velocity is 2.3 to 68 m/sec for removing 100% of the droplets having diameters no less than 8 $\mu$m, which is significantly greater as compared with the conventional droplet separators. When the applicable range of the gas velocity is great as noted above, even if the throughput changes depending on change in quantity of demand in, for example, the LNG plant so that the velocity of the gas in the pipe changes correspondingly, it can be fully dealt with.

Further, when the pressure drop is lowered, the compressor for transferring the gas can be reduced in size as compared with the prior art so that the installation cost and the operation cost can be decreased. Moreover, since the disturbance of the gas flow can be suppressed, the flow pattern of the gas and the locus of the droplets have regularity to increase the reliability of the design. As a result, the designing for excessive margins can be avoided to achieve reduction in cost.

Further, since it is not necessary to specially prepare the knockout drum, the compressor suction drum or the like for droplet separation, the space for installation thereof and the peripheral equipments are also not required so that the reduction in cost of the whole facilities including construction cost can be achieved. Moreover, by providing, for example, a manhole near the centrifugal force type separation unit, the maintenance and check can be easily carried out.

Now, the second preferred embodiment of the present invention will be described with reference to FIG. 7A.

Figure 7A:
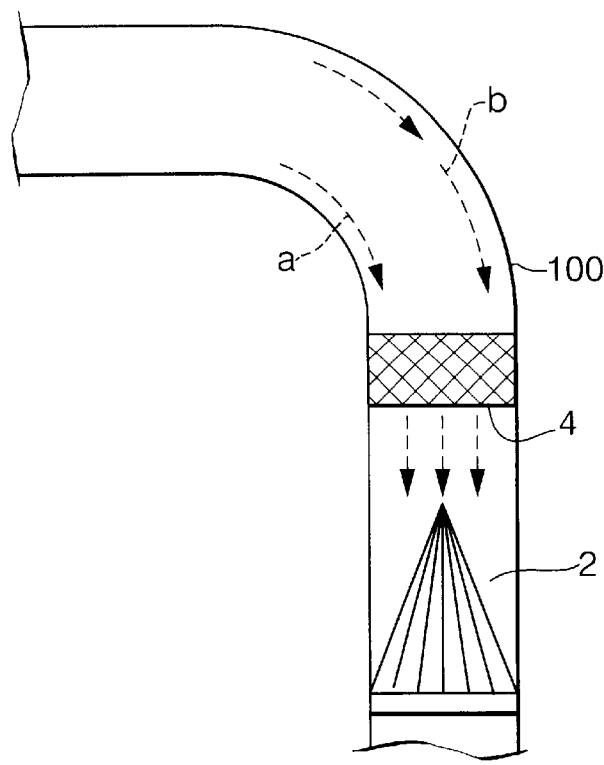
FIGS. 7A is a sectional view showing a gas transfer pipe arrangement according to a second preferred embodiment of the present invention.

As shown in FIG. 7A, in this embodiment, a gas transfer pipe 100 has a bent shape. This embodiment aims to suppress the disturbance of the gas flow generated at a bent portion of the pipe 100 until the gas flow reaches the centrifugal force type separation unit 2 provided in the gas transfer pipe 100.

In FIG. 7A, a calming means 4 of low in the form of a mesh pad made of wires having, for example, 120 $\mu$m in diameter is provided downstream of the bent portion in the pipe 100 in a perpendicular to the flow direction of the gas.

When the pipe 100 has the bent portion, the gas velocity becomes higher at an outer side b of the bent portion than at an inner side a thereof so that the gas flow having passed the bent portion is subjected to deflection. As a result, a bias in the gas flow distribution at a cross-section of the pipe 100 becomes large in the neighborhood of the separation unit 2. This causes the disturbance of the gas flow to increase the pressure drop.

In view of this, the calming means 4 is provided downstream of the bent portion in this embodiment. With this arrangement, by passing the meshes of the calming means 4, the velocity distribution of the gas at the cross-section of the pipe 100 is uniformed so that the gas flow is rectified. Specifically, when the velocity of gas is high, the droplets once captured by the mesh pad 4 are splashed by the gas flow and passes therethrough, while the gas flow is rectified through the mesh pad 4. Accordingly, even if the deflection is generated in the gas flow upstream of the calming means 4, the deflection is suppressed in the gas flow downstream of the calming means 4 so that the gas flow reaches the separation unit 2 while the disturbance of the gas flow is suppressed. The calming means 4 may be in the form of a perforated plate or the like as long as it has a rectifying effect. It is preferable that the calming means 4 causes a pressure drop as small as possible.

Figure 7B:
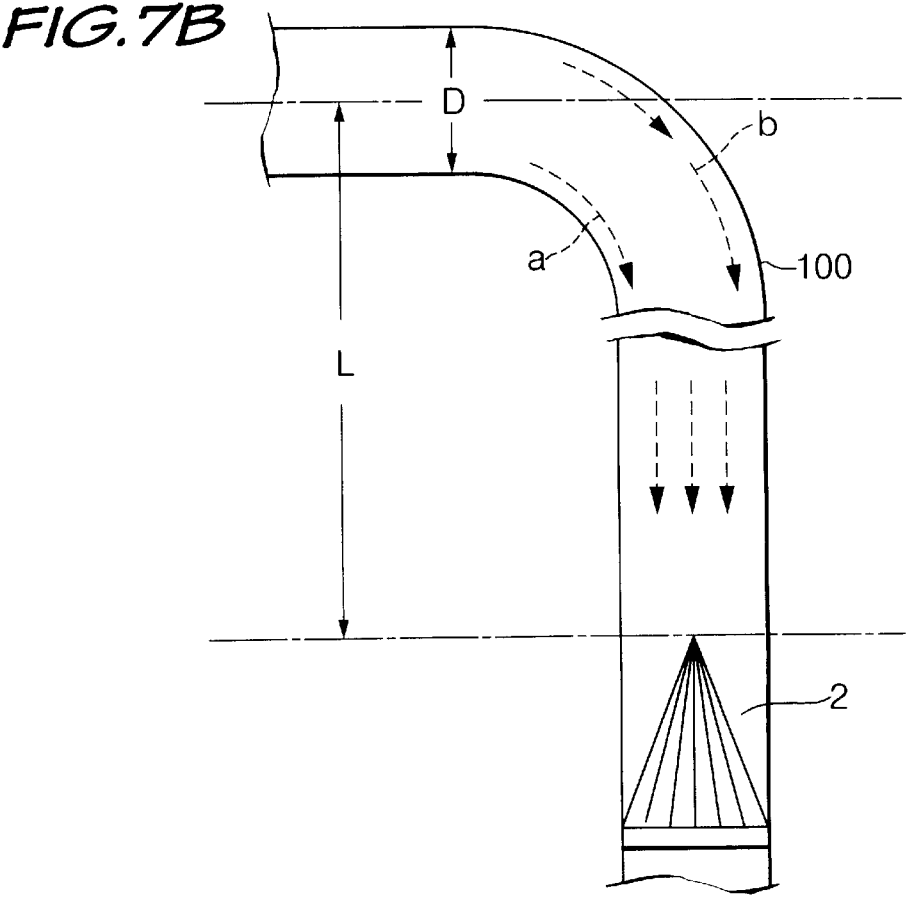
FIG. 7B is a sectional view showing a modification of the second preferred embodiment of the present invention.

FIG. 7B shows a modification of the second preferred embodiment, wherein the disturbance of the gas flow is suppressed without providing the calming means 4. In FIG. 7B, the centrifugal force type separation unit 2 is disposed downstream of the bent portion of the pipe 100, spacing from the bent portion a linear distance L, for example, 5 m, which is no less than five times a diameter D of the pipe 100. When a straight portion of the pipe 100 upstream of the separation unit 2 is sufficiently long as noted above, even if the deflection is generated in the gas flow upon passing the bent portion, the deflection is gradually reduced while the gas flow passes the long straight portion so that the disturbance of the gas flow can be suppressed. This has been confirmed through the later-described experiments.

As described above, in the second preferred embodiment and the modification thereof, even if the pipe has the bent portion, the deflection, caused at the bent portion, of the gas flow can be rectified to suppress the disturbance of the gas flow before the gas flow reaches the droplet separation unit. Thus, the droplets can be reliably separated from the gas flow.

Now, the third preferred embodiment of the present invention will be described with reference to FIGS. 8A and 8B.

Figure 8A:
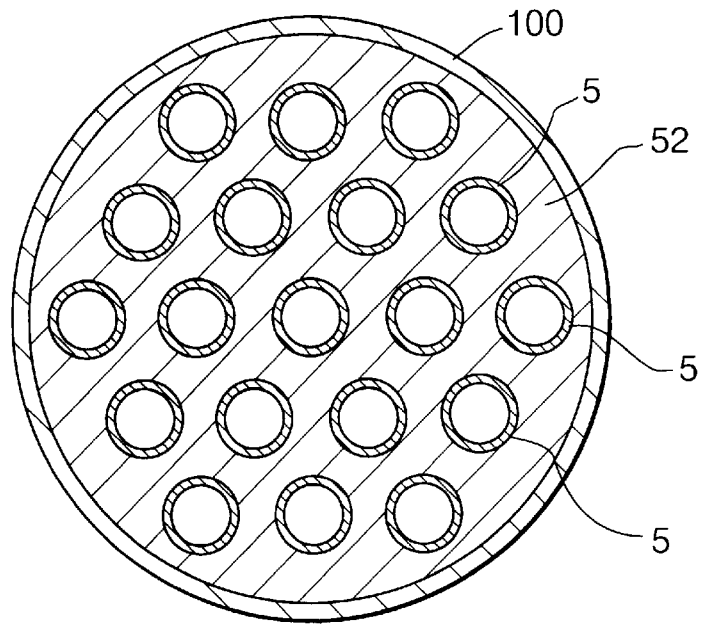
FIGS. 8A and 8B are sectional views showing a gas transfer pipe arrangement according to a third preferred embodiment of the present invention.
Figure 8B:
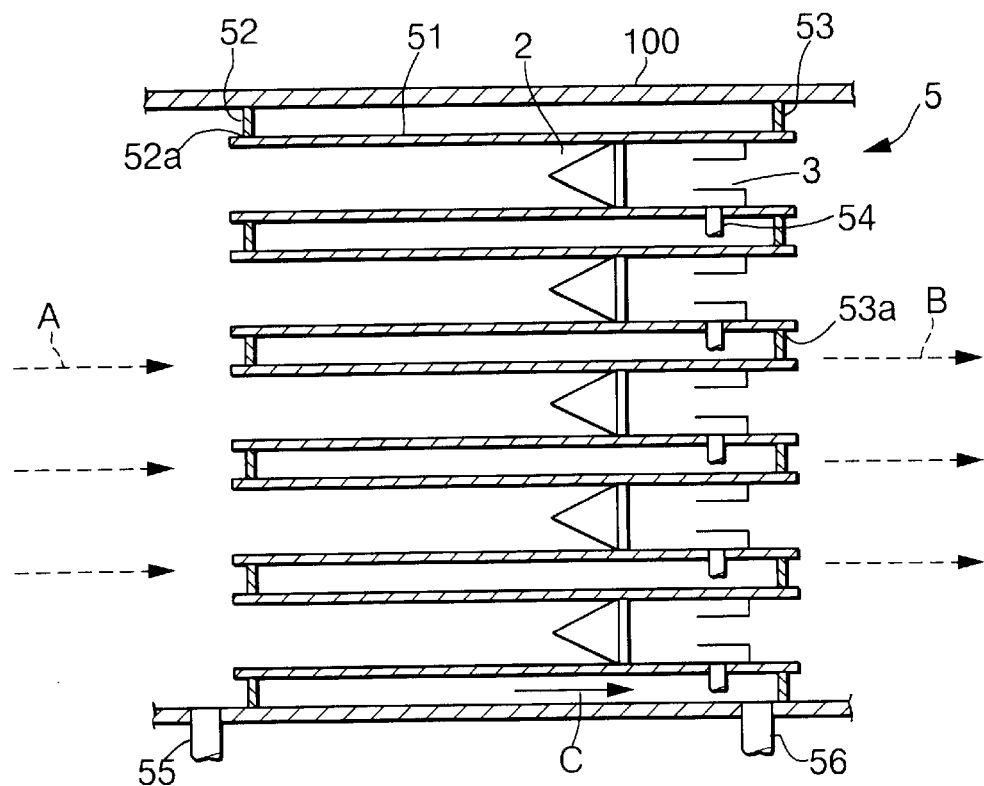

As shown in FIGS. 8A and 8B, in this embodiment, a gas flow passage in a pipe 100 is divided so as to form a bundle of a plurality of small-diameter flow passages which are arranged over a cross-section thereof perpendicular to the axis of the pipe 100, and a centrifugal force type separation unit 2 and a liquid collecting unit 3 are provided in each of the small-diameter flow passages. Specifically, each small-diameter flow passage is formed by a small-diameter short-length flow passage member 51, and the separation unit 2 and the liquid collecting unit 3 are provided in each of the flow passage members 51 as in the foregoing first preferred embodiment. As appreciated, in this embodiment, each of guide plates 21 (see FIGS. 3A to 3C) is arranged slantly relative to a diameter of the corresponding flow passage member 51. Hence, a plurality of flow passage units 5 each comprising the flow passage member 51, the separation unit 2 and the liquid collecting unit 3 are provided in the pipe 100 (see FIG. 8B). The flow passage units 5 are arranged in the pipe 100 so that an axis of each flow passage member 51 extends along the flow direction of the gas.

At upstream ends of the flow passage units 5, a support plate 52 having a plurality of insertion holes 52a is fixedly provided in the pipe 100. Similarly, at downstream ends of the flow passage units 5, a support plate 53 having a plurality of insertion holes 53a is fixedly provided in the pipe 100. Each of the flow passage members 51 is inserted into the corresponding insertion holes 52a and 53a and welded to the support plates 52 and 53. Each of the support plates 52 and 53 has a circular shape so as to match the inner periphery of the pipe 100 and is welded to the inner periphery of the pipe 100. With this arrangement, the pipe 100 is divided into the plurality of small-diameter flow passages by the corresponding number of flow passage units 5 so that the gas containing the droplets flows within each of the flow passage members 51.

Just upstream of an annular fixed portion 31 (see FIG. 2) of the liquid collecting unit 3 of each flow passage unit 5, a liquid outlet port 54 is provided at a lower side of the flow passage member 51. Further, just upstream of the support plates 52 and 53, discharge pipes 55 and 56 are connected to the pipe 100 at a lower side thereof for discharging the collected liquid to the exterior of the pipe 100.

In this embodiment, the gas containing the droplets is divided to flow into the flow passage members 51, where the droplets are separated by the respective separation units 2 and collected by the respective liquid collecting units 3. Then, the collected liquid flows downward due to the gravity via the respective liquid outlet ports 54 and is finally discharged to the exterior of the pipe 100 through the discharge pipe 56. On the other hand, liquid films collected through impingement against the support plate 52 flow downward along the support plate 52 due to the gravity and then is discharged to the exterior of the pipe 100 through the discharge pipe 55.

A further discharge pipe may be connected to the pipe 100 at the just downstream of the support plate 52 for discharging the liquid to the exterior of the pipe 100.

In this embodiment, the plurality of flow passage units 5 are disposed in the pipe 100 to divide the pipe 100 into the corresponding number of small-diameter flow passages. Since the droplets can be separated using the small-size centrifugal force type separation units 2 each having a excellent droplet separating function, the reliable droplet separation can be achieved.

As appreciated, the flow passage units 5 with the associated elements may replace the centrifugal force type separation unit 2 in FIGS. 7A and 7B.

Figure 9A:
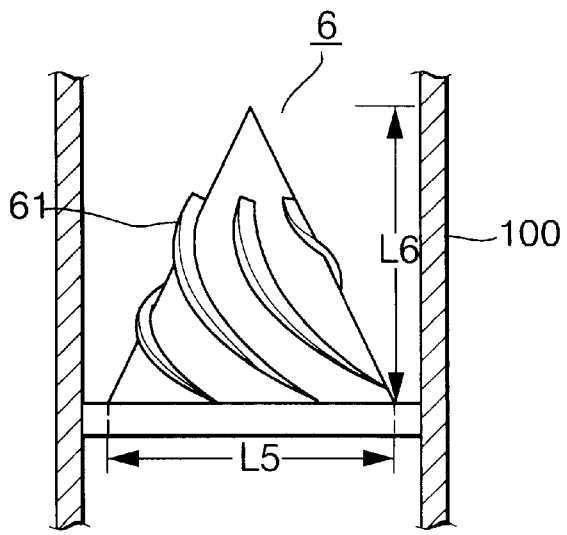
FIGS. 9A and 9B are side and plan views, respectively, showing a centrifugal force type separation unit of another example.
Figure 9B:
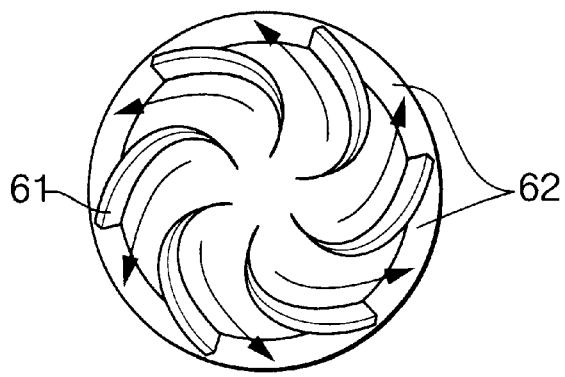
Figure 10:
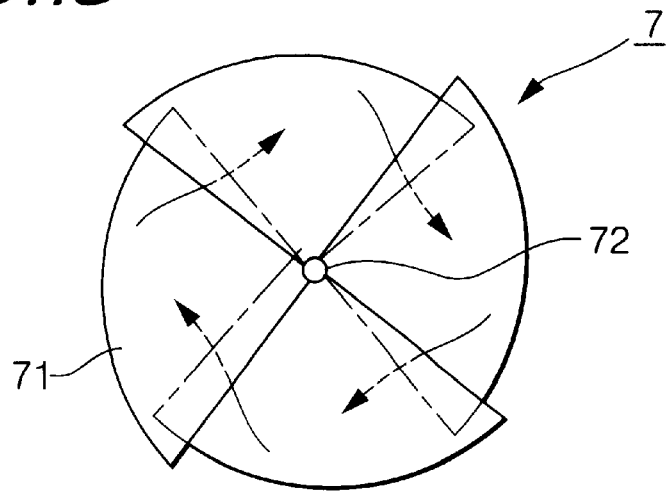
FIG. 10 is a plan view showing a centrifugal force type separation unit of another example.

In each of the foregoing preferred embodiments, a centrifugal force type separation unit having a structure as shown in FIGS. 9A and 9B or FIG. 10 may be used.

In FIGS. 9A and 9B, a centrifugal force type separation unit 6 comprises a conical body with, for example, a diameter L5 of the bottom being 0.6 m and a height L6 being 0.4 m and a plurality of (six in FIGS. 9A and 9B) swirl-flow forming vanes 61 which are fixedly arranged on the outer periphery of the conical body in a helical fashion. The separation unit 6 is arranged in the pipe 100 so that the apex of the conical body is oriented toward the upstream side and an axis of the conical body coincides with the axis of the pipe 100. As shown by arrows in FIG. 9B, the gas flows through flow passages 62 each defined between the adjacent vanes 61 to form swirl flows so that the centrifugal forces are generated. While flowing through the flow passages 62, the droplets adhere to the surfaces of the vanes 61 and the conical body and then is collected to flow along the inner periphery of the pipe 100 as liquid films.

In FIG. 10, a centrifugal force type separation unit 7 comprises four propeller-shaped swirl-flow forming vanes 71 which are mounted on a shaft 72. The vanes 71 are stationary, and the gas flows from the surfaces of the vanes 71 into gaps between the adjacent vanes 71 so that swirl flows are formed to generate the centrifugal forces. It may be arranged that the vanes 71 are rotatable.

Figure 11:
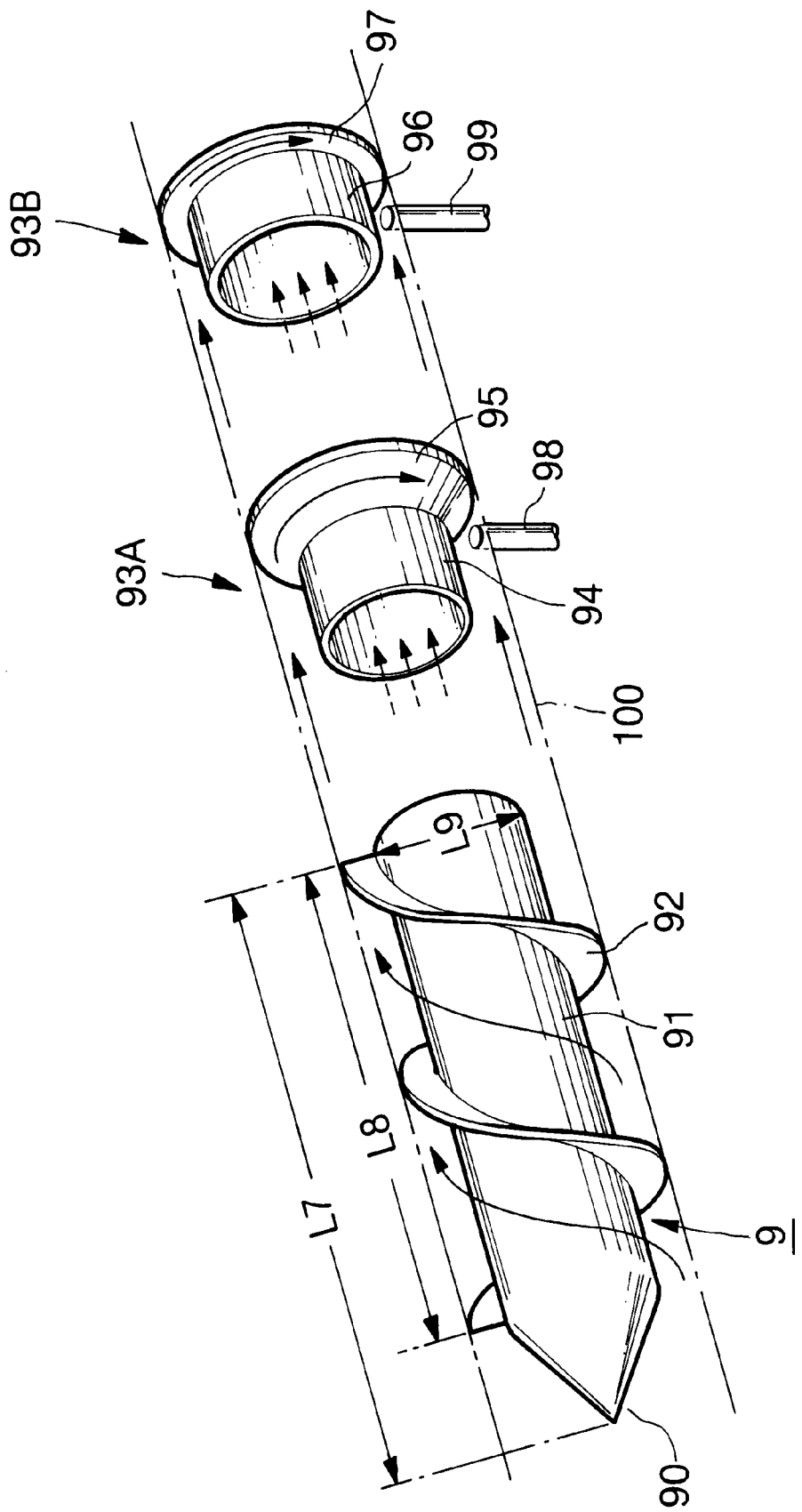
FIG. 11 is a perspective view showing a centrifugal force type separation unit and first and second liquid collecting units of another example.

Further, a centrifugal force type separation unit having a structure as shown in FIG. 11 may also be used in each of the foregoing preferred embodiments. In FIG. 11, a centrifugal force type separation unit 9 comprises a cylindrical body 91 having an axis which coincides with the axis of the pipe 100 and provided at its upstream end with an essentially conical apex portion 90 oriented in the axial direction of the pipe 100 toward the upstream side relative to the gas flow. The separation unit 9 further comprises a swirl-flow forming helical vane 92 mounted on the outer periphery of the cylindrical body 91 so as to extend helically along the axis of the cylindrical body 91. The outer edge of the helical vane 92 is in abutment with the inner periphery of the pipe 100.

When the separation unit 9 is disposed in the pipe 100 having an inner diameter of, for example, 80 mm, a length L7 from the upstream end of the apex portion 90 to the downstream end of the cylindrical body 91 is set to 150 mm to 250 mm, a length L8 of the cylindrical body 91 excluding the conical apex portion 90 is set to 100 mm to 200 mm, and a diameter L9 of the bottom of the cylindrical body 91 is set to 10 mm to 60 mm.

In FIG. 11, a first liquid collecting unit 93A and a second liquid collecting unit 93B are provided downstream of the separation unit 9. The first liquid collecting unit 93A comprises a tubular portion 94 and a guide portion 95 of a funnel shape which expands downstream from the downstream end of the tubular portion 94 to the inner periphery of the pipe 100. The downstream end of the funnel-shaped guide portion 95 is fixed to the inner periphery of the pipe 100. The second liquid collecting unit 93B comprises, like the foregoing liquid collecting unit 3, a tubular portion 96 and a guide portion (annular fixed portion) 97. The inner diameter of the tubular portion 96 is set greater than that of the tubular portion 94 of the first liquid collecting unit 93A. Just upstream of the guide portions 95 and 97, discharge pipes 98 and 99 are connected to the pipe 100 at a lower side thereof, respectively.

As shown by arrows with solid lines in FIG. 11, the gas flows helically along the outer periphery of the cylindrical body 91, guided by the helical vane 92, to form the swirl flows so that the centrifugal forces are generated. While flowing along the cylindrical body 91, the droplets contained in the gas flow collide against the cylindrical body 91 and the helical vane 92 and are collected to form liquid films. The liquid films are forced outward by the centrifugal forces generated due to the swirl flows, and then flow downstream along the inner periphery of the pipe 100. Then, the liquid films collide against the guide portion 95 of the first liquid collecting unit 93A to flow downward, and are collected via the discharge pipe 98.

On the other hand, as shown by arrows with dotted lines in FIG. 11, the gas passes the center opening of the first liquid collecting unit 93A and further flows downstream. In this fashion, the droplets are removed from the gas flow. Finer droplets which are not captured by the separation unit 9 flow into the center opening of the first liquid collecting unit 93A along with the gas. While flowing in the center opening, the finer droplets adhere to the wall defining the center opening and flow downstream along this wall. Then, the finer droplets flow to the inner periphery of the pipe 100 along the funnel-shaped inner periphery of the guide portion 95 and further to the guide portion 97 of the second liquid collecting unit 93B along the inner periphery of the pipe 100 so as to be collected there. The gas free of the foregoing finer droplets passes the center opening of the second liquid collecting unit 93 B and further flows downstream.

Since the inner periphery of the guide portion 95 gradually expands to the inner periphery of the pipe 100, the droplets adhering to the wall defining the center opening of the first liquid collecting unit 93 A easily flow to the inner periphery of the pipe 100. Thus, the droplets which have once adhered to the center opening wall are prevented from being again splashed by the gas flow.

As described above, the diameter of the center opening of the second liquid collecting unit 93B is set greater than that of the first liquid collecting unit 93A. The reason for this is that, since the amount of the droplets to be collected at the second liquid collecting unit 93B is smaller than that at the first liquid collecting unit 93A, it is not necessary to reduce the size of the center opening of the second liquid collecting unit 93B, and further, a pressure drop at this portion can be reduced with a greater center opening.

Instead of the separation unit 9, a helical guide having a width greater than a radius of the pipe 100 may be provided in the pipe 100 such that the outer edge of the helical guide abuts the inner periphery of the pipe 100 and further that, when looking the downstream side from the upstream side with the helical guide interposed therebetween, the downstream side can not be seen.

In the structure using the separation unit 9 as shown in FIG. 11 or using the foregoing helical guide instead of the separation unit 9, for suppressing the disturbance of the gas flow caused at a bent portion of the pipe 100 without providing the calming means 4 as is performed in FIG. 7B, the separation unit 9 or the helical guide may be disposed downstream of the bent portion of the pipe 100, spacing from the bent portion a linear distance which is no less than 1.5 times a diameter D of the pipe 100, as will be understood from the results of the later-described experiments.

It is preferable that the present invention is applied to a gas transfer pipe which transfers gas composed of, as a main component, hydrocarbon with carbon number 1 to 8 and containing droplets composed of, as a main component, hydrocarbon with carbon number 4 to 8. Further, in each of the foregoing preferred embodiments, it is preferable that the centrifugal force type separation unit is made of a light material having corrosion and heat resistance. As long as having such properties, various materials, such as steel and rigid, may be used for the centrifugal force type separation units depending on use.

Further, a plurality of the centrifugal force type separation units may be used in combination depending on use. In this case, the centrifugal force type separation units of different types may be combined. This can further increase the applicable range of the gas velocity. Moreover, the centrifugal force type separation unit may be permanently or detachably fixed to the inner periphery of the gas transfer pipe. In practice, after the centrifugal force type separation unit is disposed in a certain pipe, this pipe is coupled to other pipes through welding or the like.

EXAMPLES

Now, the results of the experiments will be described hereinbelow.

(Example 1)

A plurality of vinyl chloride pipes each having an inner diameter of 79 mm and a length of 5 m were provided. In one of the pipes was disposed a tuyere-type centrifugal force type separation unit having the structure shown in FIG. 2. The separation unit had a diameter L1 of 79 mm and a height L2 of 104 mm. Then, the pipes were horizontally coupled to each other to form a pipe unit. The pressure in the pipe unit were set to an atmospheric pressure. Gas containing 0.2 to 6.5 weight % droplets having mean diameters of 10 to 20 $\mu$m and diameter distribution of 1.8 to 165 $\mu$m was produced by a spray nozzle and supplied to the pipe unit while changing the gas velocity. Gas velocities in the pipe unit at which the droplets having diameters of no less than 8 $\mu$m could be captured by 100%, the gas flow energies, pressure drops corresponding to the gas velocities in the pipe unit, and a pressure drop at the gas velocity of 7 m/sec in the pipe unit were derived.

Upon producing the gas, the air temperature was set to 9 to 20° C. and the water temperature was set to 8 to 16° C. The separation unit was disposed at a position spacing from a bent portion a linear distance of about 400 mm which is about five times the inner diameter of the pipe.

Experiments were similarly carried out in those cases, respectively, where a helical-type centrifugal force type separation unit having the structure shown in FIGS. 9A and 9B was disposed in the pipe, where a propeller-type centrifugal force type separation unit having the structure shown in FIG. 10 was disposed in the pipe, and where a helical-type centrifugal force type separation unit having the structure shown in FIG. 11 was disposed in the pipe. The dimensions of the helical-type centrifugal force type separation unit (FIG. 11) were such that a length L7 was set to 100 to 250 mm, a length L8 was set to 50 to 200 mm and a diameter L9 was set to 10 to 60 mm.

Figure 12:
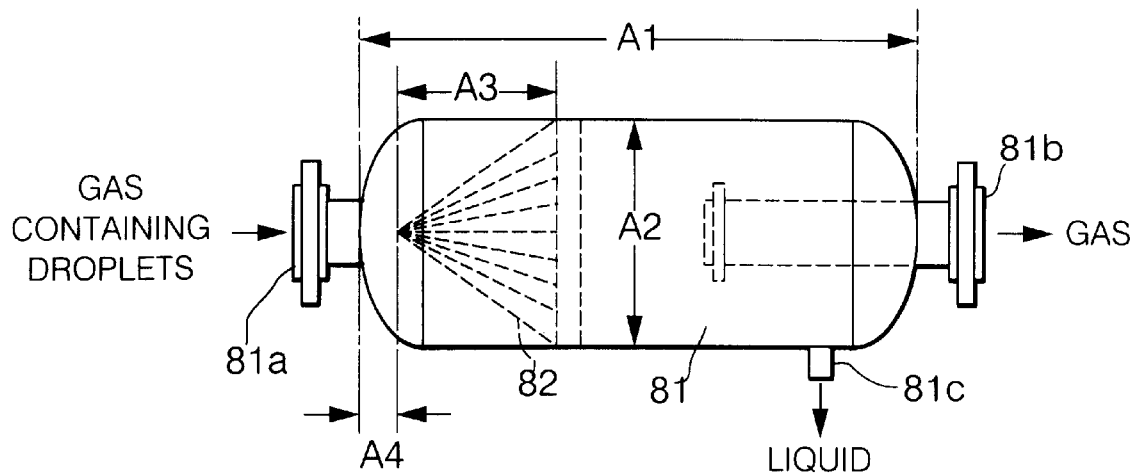
FIG. 12 is a side view showing a conventional droplet separator equipped with a tuyere.
Figure 13:
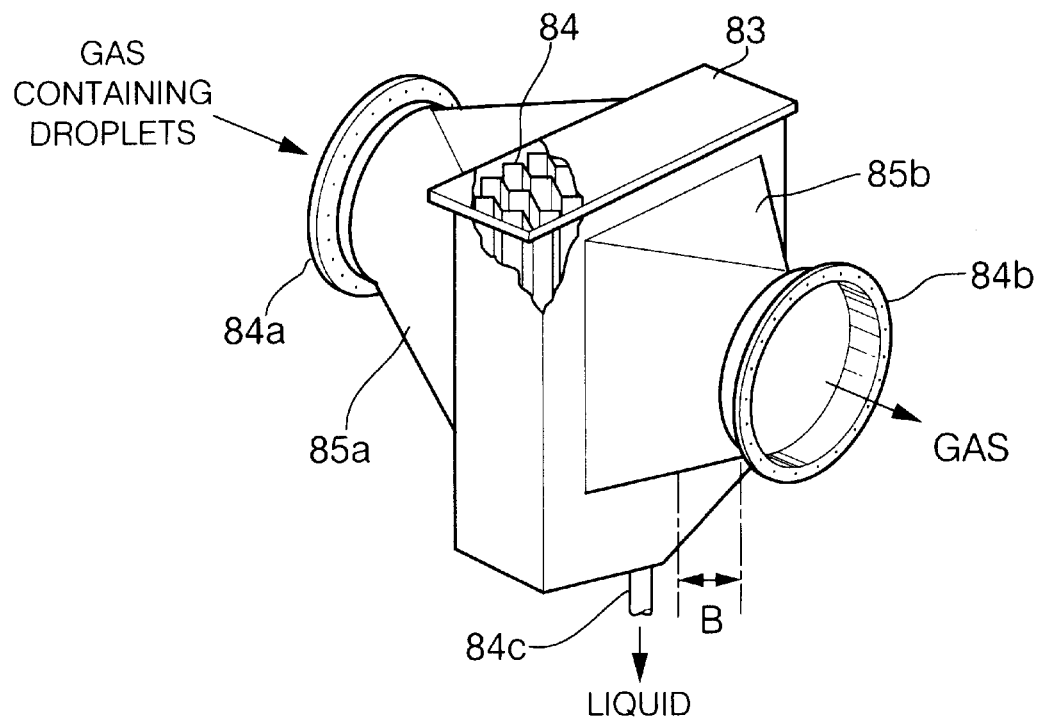
FIG. 13 is a perspective view showing a conventional droplet separator equipped with vanes.
Figure 14:
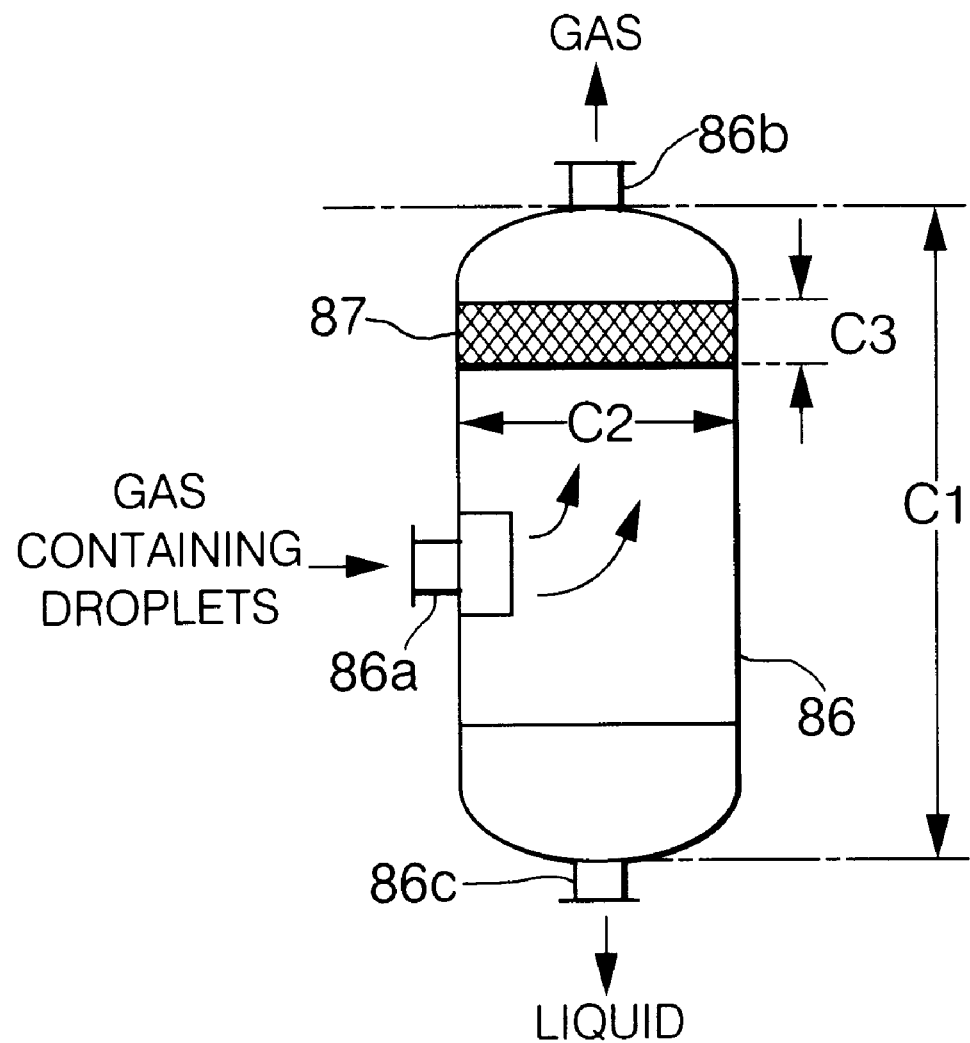
FIG. 14 is a side view showing a conventional droplet separator equipped with a pad.

As comparative examples, experiments were similarly carried out in those cases, respectively, where a conventional tuyere-type droplet separator having the structure shown in FIG. 12 was used, where a conventional vane-type droplet separator having the structure shown in FIG. 13 was used, and where a conventional mesh-type droplet separator having the structure shown in FIG. 14 was used.

The dimensions of the conventional tuyere-type droplet separator were such that a length A1 of the separator vessel 81 was set to 340 mm, an inner diameter A2 was set to 80 mm, a length A3 of the tuyere 82 was set to 52 mm, and a distance A4 between the upstream end of the separator vessel 81 and the apex of the tuyere 82 was set to 78 mm. The dimensions of the conventional vane-type droplet separator were such that the size of the separator vessel 83 was set to 1000 mm×1000 mm×400 mm and a height B of each of the flow passage members 85a and 85b was set to 500mm. Further, the dimensions of the conventional mesh-type droplet separator were such that a length C1 of the separator vessel 86 was set to 3000 mm, an inner diameter C2 was set to 800 mm, and a thickness C3 of the pad 87 was set to 150 mm.

The results of the experiments are shown in Table 1.

of 7 m/sec were 11 to 155 mmH$_2$O which were significantly smaller than those of the conventional droplet separators being 25 to 380 mmH$_2$O. As a result, the number of the compressors can be reduced upon transfer of the gas so that the installation cost can be reduced.

TABLE 1

|  |  | Gas Vel In Pipe Unit [m/sec] | Gas Flow Energy [kg/m · sec$^2$] | Pressure Drop [mm H$_2$O] | Pressure Drop At 7m/sec [mm H$_2$O] |
| --- | --- | --- | --- | --- | --- |
| Present Invention | Tuyere Type (FIG. 2) | 2.3 to 37 | 6.3 to 1640 | 10 to 1090 | 39 |
|  | Helical Type (FIGS. 9A, B) | 1.2 to 25 | 1.7 to 750 | 13 to 1590 | 155 |
|  | Propeller Type (FIG. 10) | 2.3 to 51 | 6.3 to 3120 | 3 to 500 | 19 |
|  | Helical Type (FIG. 11) | 0.3 to 70 | 0.1 to 5880 | 1 to 1700 | 11 |
| Prior Art | Tuyere Type (FIG. 12) | 5.3 to 19 | 34 to 420 | 240 to 2010 | 380 |
|  | Vane Type (FIG. 13) | 0.3 to 11.4 | 0.1 to 156 | 1 to 90 | 45 |
|  | Mesh-Type (FIG.14) | 0.1 to 3.8 | 0.1 to 17 | 1 to 11 | 25 |

From Table 1, it was confirmed that, when the centrifugal force type separation units of the present invention were disposed in the pipes, the applicable ranges of the gas velocity at which the droplets having diameters no less than 8 μm could be captured by 100% were significantly greater in upper limit as compared with the conventional droplet separators. The upper limit was particularly large when the helical-type centrifugal force type separation unit (FIG. 11) was used. Specifically, the tuyere type (FIG. 2) revealed the applicable range of 2.3 to 37 m/sec, the helical type (FIGS. 9A and 9B) revealed the applicable range of 1.2 to 25 m/sec, the propeller type (FIG. 10) revealed the applicable range of 2.3 to 51 m/sec, and the helical type (FIG. 11) revealed the applicable range of 0.3 to 70 m/sec. Following this, it was also confirmed that, when the centrifugal force type separation units of the present invention were disposed in the pipes, the gas flow energies were significantly greater in upper limit as compared with the conventional droplet separators. Specifically, when the centrifugal force type separation units of the present invention were disposed in the pipes, the upper limits were 750 to 5880 kg/m·sec$^2$, while, when the conventional droplet separators were used, the upper limits were 17 to 420 kg/·sec$^2$.

In the LNG or ethylene plant, the droplets in the gas have diameters greater than 8 μm, and the gas flow energy is approximately 500 to 4000kg/~sec$^2$. Accordingly, it is difficult to fully separate the droplets from the gas using the conventional droplet separators since the gas flow energy allowable ranges thereof are exceeded. Specifically, in the conventional droplet separators, the upper limits of the applicable gas velocity ranges are small, that is, 3.8 to 19 m/sec, so that, when the gas velocity is increased, the droplets pass through the droplet separator.

On the other hand, in the gas transfer pipe provided therein with the centrifugal force type separation unit of the present invention, since the gas flow energy in the LNG or ethylene plant is within the allowable range, the droplets in the gas can be fully separated. Further, in the present invention, since the applicable range of the gas velocity is large and thus the allowable range of the gas flow energy is also large, even if the throughput changes depending on change in quantity of demand in the LNG or ethylene plant so that the gas flow energy in the pipe changes correspondingly, it can be fully dealt with.

Further, it was also confirmed that, when the centrifugal force type separation units of the present invention were disposed in the pipes, the pressure drops at the gas velocity (Example 2)

A vinyl chloride pipe having an inner diameter D of 79 mm was provided. The pipe was bent at a right angle at a given position. At a position spacing a distance L from a downstream side of the bent portion, a tuyere-type centrifugal force type separator unit having the structure shown in FIG. 2 was disposed in the pipe, wherein a diameter L1 was set to 79 mm and a height L2 was set to 104 mm. Then, gas (air) containing water droplets having mean diameters of 10 to 20 μm and diameter distribution of 2.4 to 165 μm was produced by a spray nozzle provided at a position spacing 100 mm from an upstream side of the bent portion and supplied while changing the gas velocity in the pipe in the range between 0.6 and 37 m/sec and further changing the distance L. The ratios (L/D) between the distances L and the inner diameter D and the capturing efficiencies of the droplets having diameters no less than 8 μm were derived.

The results of the experiments are shown in Table 2.

TABLE 2

| L [mm] | 690 | 530 | 390 | 200 |
| --- | --- | --- | --- | --- |
| L/D [—] | 8.7 | 6.7 | 4.9 | 2.5 |
| Capturing Efficiency [%] | 100 | 100 | 100 | 97 |

From Table 2, it was confirmed that, if the ratio (L/D) was no less than 4.9, the capturing efficiency of the droplets having diameters no less than 8 μm became 100%. It was also confirmed that, even if the pipe had the bent portion to cause deflection in the gas flow, the droplets having diameters no less than 8 μm could be fully separated from the gas by disposing the centrifugal force type separation unit at the position spacing a distance of no less than five times the inner diameter of the pipe from the bent portion toward the downstream side.

(Example 3)

A vinyl chloride pipe having an inner diameter D of 79 mm was provided. The pipe was bent at a right angle at a given position. At a position spacing a distance L from a downstream side of the bent portion, a helical-type centrifugal force type separator unit having the structure shown in FIG. 11 was disposed in the pipe, wherein a distance L7 was set to 100 to 250 mm, a distance L8 was set to 50 to 200 mm and a diameter L9 was set to 10 to 60 mm. Then, experiments were carried out under the same conditions as those in the foregoing Example 2 to derive the ratios (L/D) between the distances L and the inner diameter D and the capturing efficiencies of the droplets having diameters no less than 8 µm.

The results of the experiments are shown in Table 3.

TABLE 3

| L [mm]              | 960  | 800  | 640 | 200 | 120 |
|---------------------|------|------|-----|-----|-----|
| L/D [—]             | 12.2 | 10.1 | 8.1 | 2.5 | 1.5 |
| Capturing Efficiency [%] | 100 | 100 | 100 | 100 | 100 |

From Table 3, it was confirmed that, if the ratio (L/D) was no less than 1.5, the capturing efficiency of the droplets having diameters no less than 8 µm became 100%. It was also confirmed that, even if the pipe had the bent portion to cause deflection in the gas flow, the droplets having diameters no less than 8 µm could be fully separated from the gas by disposing the centrifugal force type separation unit at the position spacing a distance of no less than 1.5 times the inner diameter of the pipe from the bent portion toward the downstream side.

While the present invention has been described in terms of the preferred embodiments, the invention is not to be limited thereto, but can be embodied in various ways without departing from the principle of the invention as defined in the appended claims.

What is claimed is:

1. The gas transfer pipe arrangement comprising:
    a pipe in which gas containing droplets of diameters no less than 8 µm, flows at a velocity of no less than 6m/sec;
    a centrifugal force separation unit provided in said pipe for applying a radial centrifugal force to the gas flowing in said pipe so that the droplets in the gas adhere to an inner Periphery of said pipe to be separated from the gas;
    a liquid collecting unit annularly provided at the inner periphery of said pipe at a position downstream of said centrifugal force separation unit for collecting a liquid from the droplets separated by said centrifugal force separation unit; and
    a discharge unit for discharging the liquid collected by said liquid collecting unit to the exterior of said pipe;
    wherein said pipe has a bent portion, and wherein said centrifugal force separation unit is provided at a position spaced downstream from said bent portion by a linear distance which is no less than 2.5 times a diameter of said pipe.

2. The gas transfer pipe arrangement according to claim 1, wherein gas flow calming means is provided upstream of said centrifugal force separation unit.

3. The gas transfer pipe arrangement according to claim 2, wherein said gas flow calming means comprises one of a mesh pad and a perforated plate.

4. The gas transfer pipe arrangement comprising:
    a pipe in which gas containing droplets of diameters no less than 8 µm, flows at a velocity of no less than 6m/sec;
    a centrifugal force separation unit provided in said pipe for applying a radial centrifugal force to the gas flowing in said pipe so that the droplets in the gas adhere to an inner periphery of said pipe to be separated from the gas;
    a liquid collecting unit annularly provided at the inner periphery of said pipe at a position downstream of said centrifugal force separation unit for collecting a liquid from the droplets separated by said centrifugal force separation unit; and
    a discharge unit for discharging the liquid collected by said liquid collecting unit to the exterior of said pipe;
    wherein said centrifugal force separation unit comprises:
        a cylindrical body having an axis which coincides with an axis of said pipe and provided at its upstream end with an essentially conical apex portion oriented in an axial direction of said pipe toward an upstream side relative to the flow of the gas; and
        a helical vane mounted on an outer periphery of said cylindrical body so as to extend helically along the axis of said cylindrical body, said helical vane having an outer edge which is in abutment with the inner periphery of said pipe; and
    wherein said pipe has a bent portion, and wherein said centrifugal force separation unit is provided at a position spaced downstream from said bent portion by a linear distance which is no less than 1.5 times a diameter of said pipe.

5. The gas transfer pipe arrangement comprising:
    a pipe in which gas containing droplets of diameters no less than 8 µm, flows at a velocity of no less than 6m/sec;
    a centrifugal force separation unit provided in said pipe for applying a radial centrifugal force to the gas flowing in said pipe so that the droplets in the gas adhere to an inner periphery of said pipe to be separated from the gas;
    a liquid collecting unit annularly provided at the inner periphery of said pipe at a position downstream of said centrifugal force separation unit for collecting a liquid from the droplets separated by said centrifugal force separation unit;
    a discharge unit for discharging the liquid collected by said liquid collecting unit to the exterior of said pipe; and
    a helical body having an axis which coincides with an axis of said pipe and extending helically along the axis of said pipe, said helical body having an outer edge which is in abutment with the inner periphery of said pipe; and
    wherein said pipe has a bent portion, and wherein said centrifugal force separation unit is provided at a position spaced downstream from said bent portion by a linear distance which is no less than 1.5 times a diameter of said pipe.

6. A gas transfer pipe arrangement comprising:
    a pipe in which gas containing droplets of diameters no less than 8 µm, flows at a velocity of no less than 6m/sec;
    a plurality of flow passage members provided in said pipe for dividing a flow passage in said pipe into a corresponding number of small-diameter flow passages so as to form a bundle of the small-diameter flow passages;
    a plurality of centrifugal force separation units each provided in corresponding one of said flow passage members for applying a radial centrifugal force to the gas flowing in said flow passage member so that the droplets in the gas adhere to an inner periphery of each of said flow passage members to be separated from the gas;
    a plurality of liquid collecting units each annularly provided at the inner periphery of corresponding one of said flow passage members at a position downstream of said centrifugal force separation unit for collecting a liquid from the droplets separated by said centrifugal force separation unit; and a discharge unit for discharging the liquid collected by said liquid collecting units to the exterior of said pipe wherein said pipe has a bent portion, and wherein each of said centrifugal force separation units is provided at a position spaced downstream from said bent portion by a linear distance which is no less than 2.5 times a diameter of said pipe.

7. The gas transfer pipe arrangement according to claim 6, wherein gas flow calming means is provided upstream of said centrifugal force separation units.

8. The gas transfer arrangement according to claim 7, wherein said gas flow calming means comprises one of a mesh pad and a perforated plate.

9. A transfer pipe arrangement comprising:

a pipe in which gas containing droplets of diameters no less than 8 μm flows at a velocity of no less than 6m/sec;

a plurality of flow passage members provided in said pipe for dividing a flow passage in said pipe into a corresponding number of small-diameter flow passages so as to form a bundle of the small-diameter flow passages;

a plurality of centrifugal force separation units each provided in corresponding one of said flow passage members for applying a radial centrifugal force to the gas flowing in said flow passage member so that the droplets in the gas adhere to an inner periphery of each of said flow passage members to be separated from the gas;

a plurality of liquid collecting units each annularly provided at the inner periphery of corresponding one of said flow passage members at a position downstream of said centrifugal force separation unit for collecting a liquid from the droplets separated by said centrifugal force separation unit; and a discharge unit for discharging the liquid collected by said liquid collecting units to the exterior of said pipe; and wherein each of said centrifugal force separation units comprises:

a cylindrical body having an axis which coincides with an axis of the corresponding flow passage member and provided at its upstream end with an essentially conical apex portion oriented in an axial direction of the corresponding flow passage member toward an upstream side relative to the flow of the gas; and a helical vane mounted on an outer periphery of said cylindrical body so as to extend helically along the axis of said cylindrical body, a said helical vane having an outer edge which is in abutment with the inner periphery of the corresponding flow passage member;

wherein said pipe has a bent portion, and wherein each of said centrifugal force separation units is provided at a position spaced downstream from said bent portion by a linear distance which is no less than 1.5 times a diameter of said pipe.

10. The gas transfer pipe arrangement comprising:

a pipe in which gas containing droplets of diameters no less than 8 μm flows at a velocity of no less than 6m/sec;

a plurality of flow passage members provided in said pipe for dividing a flow passage in said pipe into a corresponding number of small-diameter flow passages so as to form a bundle of the small-diameter flow passages;

a plurality of centrifugal force separation units each provided in corresponding one of said flow passage members for applying a radial centrifugal force to the gas flowing in said flow passage member so that the droplets in the gas adhere to an inner periphery of each of said flow passage members to be separated from the gas;

a plurality of liquid collecting units each annularly provided at the inner periphery of corresponding one of said flow passage members at a position downstream of said centrifugal force separation unit for collecting a liquid from the droplets separated by said centrifugal force separation unit;

a discharge unit for discharging the liquid collected by said liquid collecting units to the exterior of said pipe; and a helical body having an axis which coincides with an axis of the corresponding flow passage member and extending helically along the axis of the corresponding flow passage, said helical body having an outer edge which is in abutment with the inner periphery of the corresponding flow passage member; and wherein said pipe has a bent portion, and wherein each of said centrifugal force separation units is provided at a position spaced downstream from said bent portion by a linear distance which is no less than 1.5 times a diameter of said pipe.

* * * * *